(12) United States Patent
Boulay et al.

(10) Patent No.: US 9,230,439 B2
(45) Date of Patent: Jan. 5, 2016

(54) METHOD AND SYSTEM FOR MONITORING INTERACTIONS WITH A VEHICLE

(75) Inventors: André Boulay, Île Bizard (CA); Jason Gallovich, Dorval (CA)

(73) Assignee: Otodata Wireless Network Inc., Saint-Laurent, Quebec (CA)

( * ) Notice: Subject to any disclaimer, the term of this patent is extended or adjusted under 35 U.S.C. 154(b) by 145 days.

(21) Appl. No.: 14/118,484

(22) PCT Filed: May 17, 2012

(86) PCT No.: PCT/CA2012/000477
§ 371 (c)(1),
(2), (4) Date: Nov. 18, 2013

(87) PCT Pub. No.: WO2012/159195
PCT Pub. Date: Nov. 29, 2012

(65) Prior Publication Data
US 2014/0106781 A1 Apr. 17, 2014

Related U.S. Application Data

(60) Provisional application No. 61/488,291, filed on May 20, 2011.

(51) Int. Cl.
*B60R 25/10* (2013.01)
*G08G 1/123* (2006.01)
(Continued)

(52) U.S. Cl.
CPC ............ *G08G 1/123* (2013.01); *B60R 16/0231* (2013.01); *B60R 25/33* (2013.01); *B60W 50/08* (2013.01); *B60W 50/14* (2013.01);
(Continued)

(58) Field of Classification Search
CPC ...... B60W 50/14; B60R 16/0231; A61B 5/18
USPC ........... 340/426.19, 439; 701/39, 43; 702/183
See application file for complete search history.

(56) References Cited

U.S. PATENT DOCUMENTS 5,832,394 A 11/1998 Wortham et al.
6,580,973 B2 * 6/2003 Leivian et al. .................... 701/1
(Continued)

FOREIGN PATENT DOCUMENTS

CA 2681474 9/2008
WO 0234571 A2 5/2002

OTHER PUBLICATIONS

Patent Cooperation Treaty, "International Search Report" Canadian Searching Authority, document of 5 pages, dated Jul. 5, 2012.

*Primary Examiner* — John A Tweel, Jr.
(74) *Attorney, Agent, or Firm* — Fasken Martineau DuMoulin LLP; Alexandre Abecassis

(57) ABSTRACT

A method and system for monitoring interactions with a vehicle are disclosed, the method comprising associating a mobile device of a user allowed for operating the vehicle with a device capable of providing an indication of a position of the vehicle; obtaining position data from the device capable of providing an indication of a position of the vehicle; obtaining position data from the mobile device associated with the device; comparing the obtained position data from the device with the obtained position data from the mobile device and using the comparison of the position data of the device with the position data of the mobile device to thereby monitor interactions with the vehicle.

30 Claims, 7 Drawing Sheets

(51) Int. Cl.
  *B60W 50/14*    (2012.01)
  *B60R 16/023*   (2006.01)
  *G08G 1/00*     (2006.01)
  *B60R 25/33*    (2013.01)
  *H04W 4/02*     (2009.01)
  *H04L 29/08*    (2006.01)
  *B60W 50/08*    (2012.01)
  *H04W 4/12*     (2009.01)
  *H04W 4/04*     (2009.01)

(52) U.S. Cl.
  CPC ............... *G08G 1/205* (2013.01); *H04L 67/12* (2013.01); *H04W 4/02* (2013.01); *H04W 4/023* (2013.01); *H04W 4/12* (2013.01); *H04W 4/046* (2013.01)

(56) References Cited

U.S. PATENT DOCUMENTS

| 6,909,947 B2 * | 6/2005 | Douros et al. .................. 701/39 |
| 6,925,425 B2 * | 8/2005 | Remboski et al. ............ 702/183 |
| 7,565,230 B2 * | 7/2009 | Gardner et al. ............... 340/439 |

* cited by examiner

METHOD AND SYSTEM FOR MONITORING INTERACTIONS WITH A VEHICLE

CROSS-REFERENCE TO RELATED APPLICATION

The application claims priority of U.S. Provisional patent application No. 61/488,291 entitled "METHOD AND SYSTEM FOR MONITORING INTERACTIONS WITH A VEHICLE" that was filed on May 20, 2011, the specification of which is hereby incorporated by reference.

FIELD OF THE INVENTION

The invention relates to the field of monitoring systems. More precisely, this invention pertains to a method and system for monitoring interactions with a vehicle.

BACKGROUND

Being able to monitor interactions with a vehicle is of great interest for various reasons.

For instance, such monitoring may be of interest for preventing vehicle theft. In fact, such monitoring may further be used in some cases in order to further locate a stolen vehicle.

Prior art configurations may be cumbersome of various reasons. For instance, a user may have to carry a key fob for using the vehicle without triggering the alarm system. This may be complicated to manage in the case of a vehicle shared by a plurality of users since either a key fob has to be shared amongst the plurality of users, which is quite cumbersome, or since additional key fobs have to be bought in order to accommodate each of the plurality of users, which can be quite pricey.

Also, carrying a key fob on a key chain is also a drawback since it adds volume and weight.

There is a need for a method and system that will overcome at least one of the above identified drawbacks.

Features of the invention will be apparent from review of the disclosure, drawings and description of the invention below.

BRIEF SUMMARY

According to a broad aspect of the invention there is provided a method for monitoring interactions with a vehicle, the method comprising associating a mobile device of a user allowed for operating the vehicle with a device capable of providing an indication of a position of the vehicle; obtaining position data from the device capable of providing an indication of a position of the vehicle;

obtaining position data from the mobile device associated with the device; comparing the obtained position data from the device with the obtained position data from the mobile device and using the comparison of the position data of the device with the position data of the mobile device to thereby monitor interactions with the vehicle.

In accordance with an embodiment, the associating of a mobile device of a user with a device capable of providing an indication of a position of the vehicle comprises accessing a web page and registering the mobile device of the user with a given vehicle.

In accordance with another embodiment, the registering of the mobile device of the user with the given vehicle comprises downloading and executing an application on the mobile device.

In accordance with an embodiment, the obtaining of the position data from the mobile device comprises the application providing the position data.

In accordance with yet another embodiment, the execution of the application comprises providing an indication of the vehicle to be monitored.

In accordance with another embodiment, the indication of the vehicle to be monitored is selected from a group consisting of a name, a Vehicle Identification Number (VIN), a plate and a customer identification number.

In accordance with another embodiment, the associating of a mobile device of a user allowed for operating the vehicle with a device capable of providing an indication of a position of the vehicle comprises sending a short message service (SMS) message comprising an identification of the vehicle to a SMS gateway.

In accordance with yet another embodiment, the obtaining of position data from the device capable of providing an indication of a position of the vehicle comprises obtaining position data from one of a GPS receiver installed in the vehicle and an OnStar™ FMV device installed in said vehicle.

In accordance with another embodiment, the obtaining of position data from the device capable of providing an indication of a position of the vehicle comprises determining an indication of a geographic sector where the vehicle is located.

In accordance with a further embodiment, the determining of an indication of a geographic sector where the vehicle is located comprises providing a vehicle with a wireless transmitter and a given one of a plurality of wireless receivers receiving a signal transmitted by the wireless transmitter and providing a corresponding identification of a sector where the given receiver is located.

In accordance with yet another embodiment, the comparing of the obtained position data from the device with the obtained position data from the mobile device is performed over time; the using of the comparison of the position data of the device with the position data of the mobile device comprises detecting a variation in a comparison result; if the variation is detected, determining if the vehicle is moving and if the vehicle is moving, providing an alert to a third party.

In accordance with yet another embodiment, the third party is the user of the vehicle.

In accordance with an embodiment, the providing of the alert comprises sending an email to the third party.

In accordance with an embodiment, the providing of the alert comprises sending an SMS message to the third party.

In accordance with yet another embodiment, the providing of the alert comprises calling the mobile device of the user.

In accordance with another aspect of the invention, there is provided a vehicle interaction monitoring unit for monitoring interactions with a vehicle, the vehicle interaction monitoring unit comprising a position data receiving unit for receiving a position data from a vehicle position data providing unit; a mobile device data receiving unit for receiving a mobile device data signal, the mobile data signal comprising position data from the mobile device of a user of the vehicle and a processing unit operatively connected to the position data receiving unit and to the mobile device data receiving unit, the processing unit for comparing position data from the vehicle position data providing unit with the position data from the mobile device, the processing further using a result from the comparison between the position data from the vehicle position data providing unit with the position data from the mobile device for providing an indication of an interaction of the user with the vehicle.

In accordance with an embodiment, the position data is received from the vehicle position data providing unit via a data network.

In accordance with another embodiment, the position data is received from the mobile device via a data network.

In accordance with yet another embodiment, the vehicle position data providing unit comprises one of a GPS receiver and an OnStar™ FMV device.

In accordance with another embodiment, the vehicle interaction monitoring unit further comprises a memory unit operatively connected to the processing unit, wherein the processing unit stores the position data from the vehicle position data providing unit and the position data from the mobile device over time in the memory unit.

In accordance with yet another embodiment, the use of the result from the comparison between the position data from the vehicle position data providing unit with the position data from the mobile device comprises detecting a variation over time in a result of a comparison between the stored position data from the vehicle position data providing unit and the stored position data from the mobile device.

In accordance with an embodiment, the vehicle interaction monitoring unit further comprises an interaction indication providing unit operatively connected to the processing unit, the interaction indication providing unit for providing an indication of an interaction between the user and the vehicle to a third party.

In accordance with another embodiment, the third party is the user.

In accordance with another embodiment, the interaction indication providing unit provides the indication of an interaction using one of an email, a SMS message and a call made on mobile device of the user.

In accordance with yet another embodiment, the vehicle interaction monitoring unit further comprises a registering unit operatively connected to the processing unit, the registering unit for receiving from a given user an indication of a given associated mobile device with a given vehicle, further wherein the processing unit receives and stores in the memory unit the position data from the given vehicle position data providing unit and the position data from the given mobile device over time together with an indication of the corresponding registered vehicle.

In accordance with yet another embodiment, the registering unit is accessed by the given user via a data network.

In accordance with another embodiment, the data network comprises the Internet, the vehicle registering unit comprises a web server.

In accordance with a broad aspect of the invention, there is provided a computer-readable storage medium for storing computer-executable instructions which, when executed, cause a computing device to perform a method for monitoring interactions with a vehicle performing, the method comprising associating a mobile device of a user allowed for operating the vehicle with a device capable of providing an indication of a position of the vehicle; obtaining position data from the device capable of providing an indication of a position of the vehicle; obtaining position data from the mobile device associated with the device, comparing the obtained position data from the device with the obtained position data from the mobile device and using the comparison of the position data of the device with the position data of the mobile device to thereby monitor interactions with the vehicle.

In accordance with another broad aspect of the invention, there is provided a computing device, the computing device comprising a display unit; a processing unit operatively connected to the display unit; a memory operatively connected to the processing unit, the memory comprising one or more programs, wherein the one or more programs are stored in the memory and configured to be executed by the processing unit, the one or more programs including: instructions for associating a mobile device of a user allowed for operating the vehicle with a device capable of providing an indication of a position of the vehicle; instructions for obtaining position data from the device capable of providing an indication of a position of the vehicle; instructions for obtaining position data from the mobile device associated with the device; instructions for comparing the obtained position data from the device with the obtained position data from the mobile device and instructions for using the comparison of the position data of the device with the position data of the mobile device to thereby monitor interactions with the vehicle.

In accordance with another broad aspect of the invention, there is disclosed a method for monitoring interactions with an item, the method comprising associating a mobile device of a user with a device capable of providing an indication of a position of the item; obtaining position data from the device capable of providing an indication of a position of the item; obtaining position data from the mobile device associated with the device; comparing the obtained position data from the device with the obtained position data from the mobile device and using the comparison of the position data of the device with the position data of the mobile device to thereby monitor interactions with the item.

An advantage of the embodiment disclosed is that no key fob is required for implementing the method for monitoring interactions with a vehicle disclosed herein thanks to the use of a mobile device.

Another advantage of the method for monitoring interactions disclosed herein is that the method may be performed even if the vehicle is shared amongst a group of users provided that each user has a mobile device or an access to a mobile device.

Another advantage of one embodiment of the method disclosed is that the monitoring may be performed transparently with or without any user input. This may be of great advantage for monitoring a user activity.

Another advantage of one embodiment of the method disclosed is that an application running on the mobile device may also provide additional information such as an indication of a battery level in order to warn the vehicle interaction monitoring unit of a shortcoming turnoff of the mobile device.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
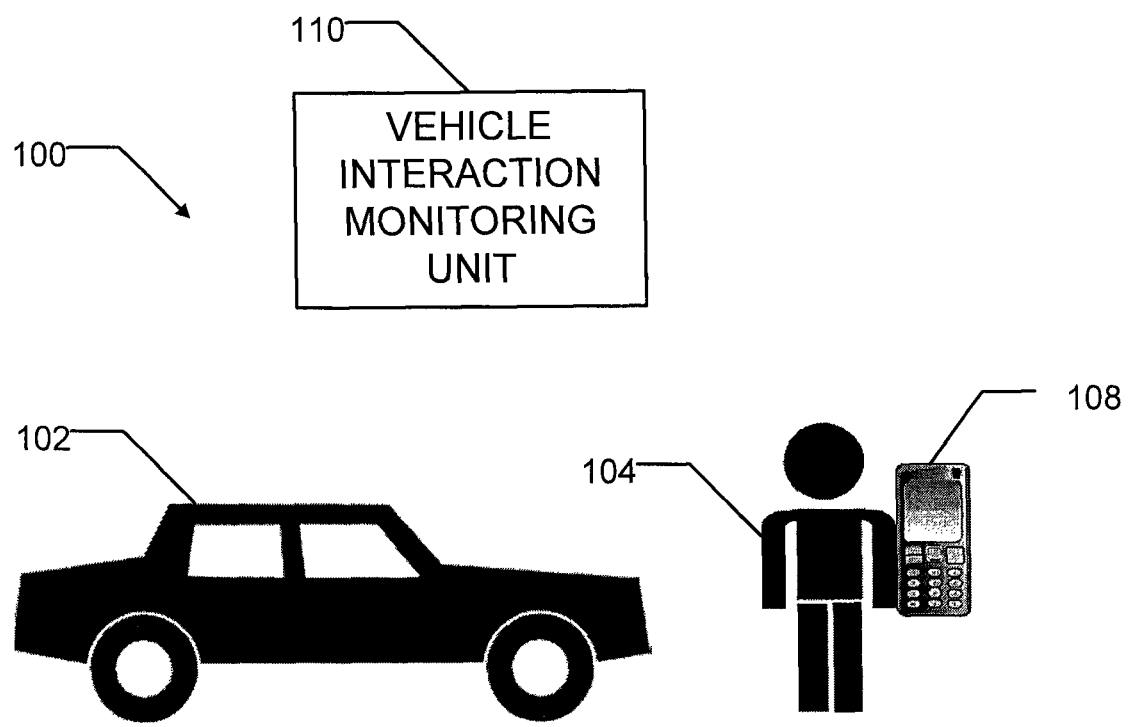
FIG. 1 is a schematic which shows an embodiment of a system for monitoring interactions with a vehicle.

Now referring to FIG. 1, there is shown an embodiment of a system 100 for monitoring interactions with a vehicle 102.

In this embodiment, the system 100 comprises a vehicle position data providing unit, not shown, a mobile device 108 and a vehicle interaction monitoring unit 110.

Still in this embodiment, the vehicle position data providing unit is installed in the vehicle 102 for which interactions have to be monitored.

It will be appreciated that various alternative embodiments may be provided as further explained below.

Figure 2A:
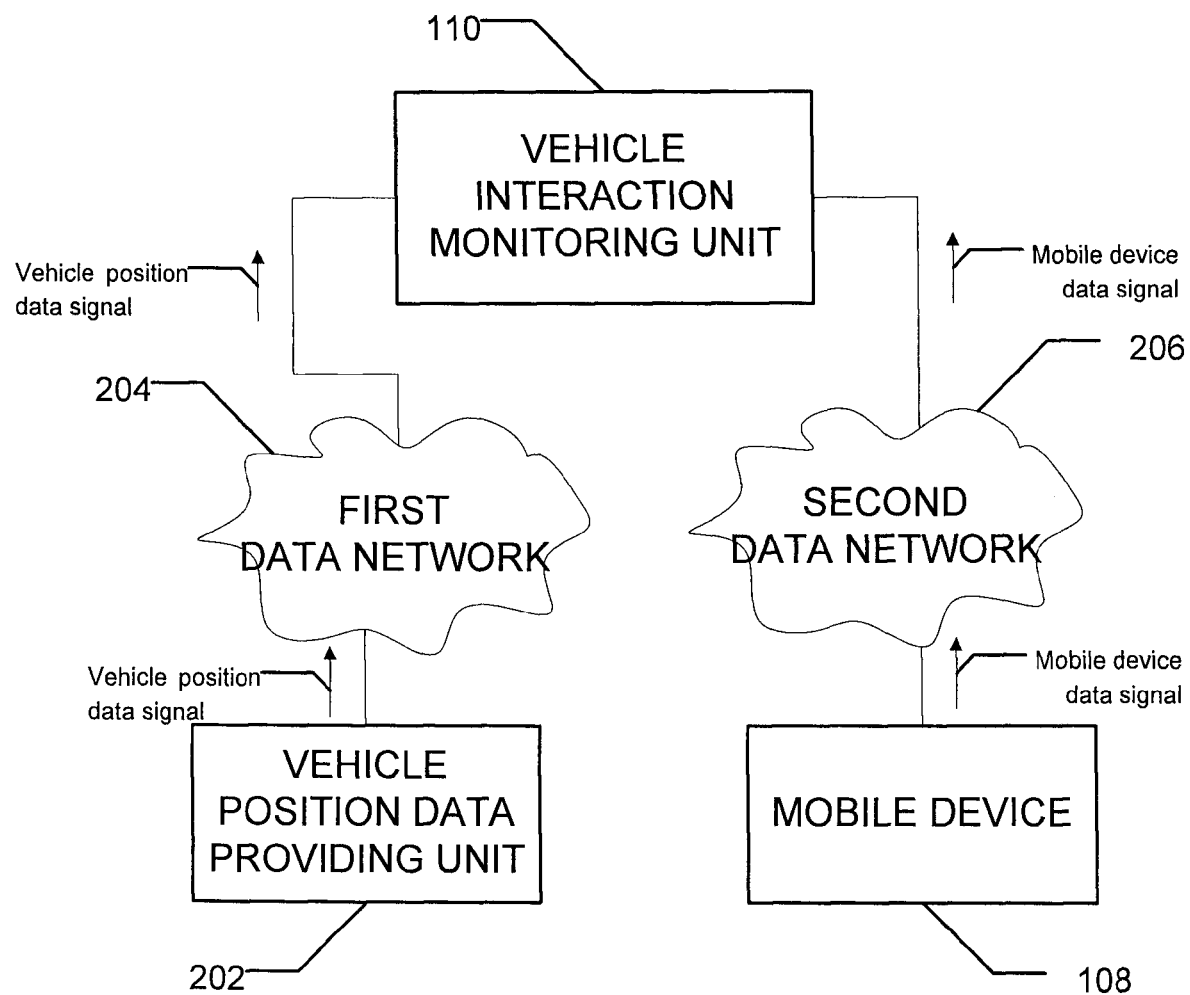
FIG. 2A is a block diagram which shows an embodiment of a system for monitoring interactions with a vehicle. In this embodiment the system comprises, inter alia, a vehicle position data providing unit, a mobile device and a vehicle interaction monitoring unit.

Now referring to FIG. 2A, there is shown an implementation of an embodiment of the system for monitoring interactions with a vehicle.

In this embodiment, the system for monitoring interactions with a vehicle comprises a vehicle position data providing unit 202.

The vehicle position data providing unit 202 is used for providing data used for providing an indication of a position of the vehicle. It will be appreciated that the vehicle position data providing unit 202 is secured to the vehicle.

It will be appreciated that the data used for determining a position of the vehicle may be of various types. For instance, the data may comprise an indication of a geographic location of the vehicle, such as geographic coordinates. Such indication of a geographic location of the vehicle may be generated from a Global Positioning System (GPS) receiver installed in the vehicle or from a system using a Global Positioning System (GPS) receiver, such as OnStar™ FMV device.

In a preferred embodiment, the vehicle position data providing unit 202 is a GPS receiver having the capability of reporting back its current location.

Alternatively, it will be appreciated that the data used for determining a position of the vehicle may comprise data used for determining an indication of a geographic sector where the vehicle is located, i.e. the indication of a geographic sector is derived from the data per se. In fact, it should be understood that the geographic sector may be of various sizes ranging from a couple of square meters to a couple of square kilometers. In such embodiment, the vehicle position data providing unit 202 comprises a transmitter transmitting data to a network of fixed and/or mobile base stations. The transmitter is located in the vehicle. The data transmitted by the transmitter comprise an identification of the vehicle and position data are derived depending on which base station receives the transmitted data. The skilled addressee will appreciate that in this embodiment the indication of a position of a vehicle is not as accurate as an indication of a position of a vehicle provided by a Global Positioning System (GPS) receiver.

The vehicle position data providing unit 202 is operatively connected to a first data network 204.

The first data network 204 comprises a wireless data network. It will be appreciated that the wireless data network may be of various types. For instance, the wireless data network may be selected from a group consisting of mobile device networks, satellite data networks, point to point wireless data networks or the like.

In a preferred embodiment, the first data network 204 comprises a proprietary wireless network of base stations for receiving data and sending the data to a central location via a modem operating on a mobile device network (i.e. cellular).

Moreover it will be appreciated by the skilled addressee that the vehicle position data providing unit 202 comprises a communication port, not shown, adapted for enabling communication with the first data network 204.

The mobile device 108 is operatively connected to a second data network 206.

In a preferred embodiment, it will be appreciated that the mobile device 108 will be typically carried by a user operating the vehicle.

Alternatively, the mobile device 108 will be carried by a passenger of the vehicle.

The second data network 206 comprises a wireless data network. It will be appreciated that the wireless data network may be of various types. For instance, the wireless data network may be selected from a group consisting of mobile device networks, satellite data networks, point to point wireless data networks or the like.

In a preferred embodiment, the second data network 206 comprises a mobile device network.

It will be appreciated that in one embodiment the first data network 204 and the second data network 206 form a single data network.

The vehicle interaction monitoring unit 110 is used for monitoring interactions with a vehicle as further explained below.

The vehicle interaction monitoring unit 110 is operatively connected to the first data network 204 and to the second data network 206.

Figure 2B:
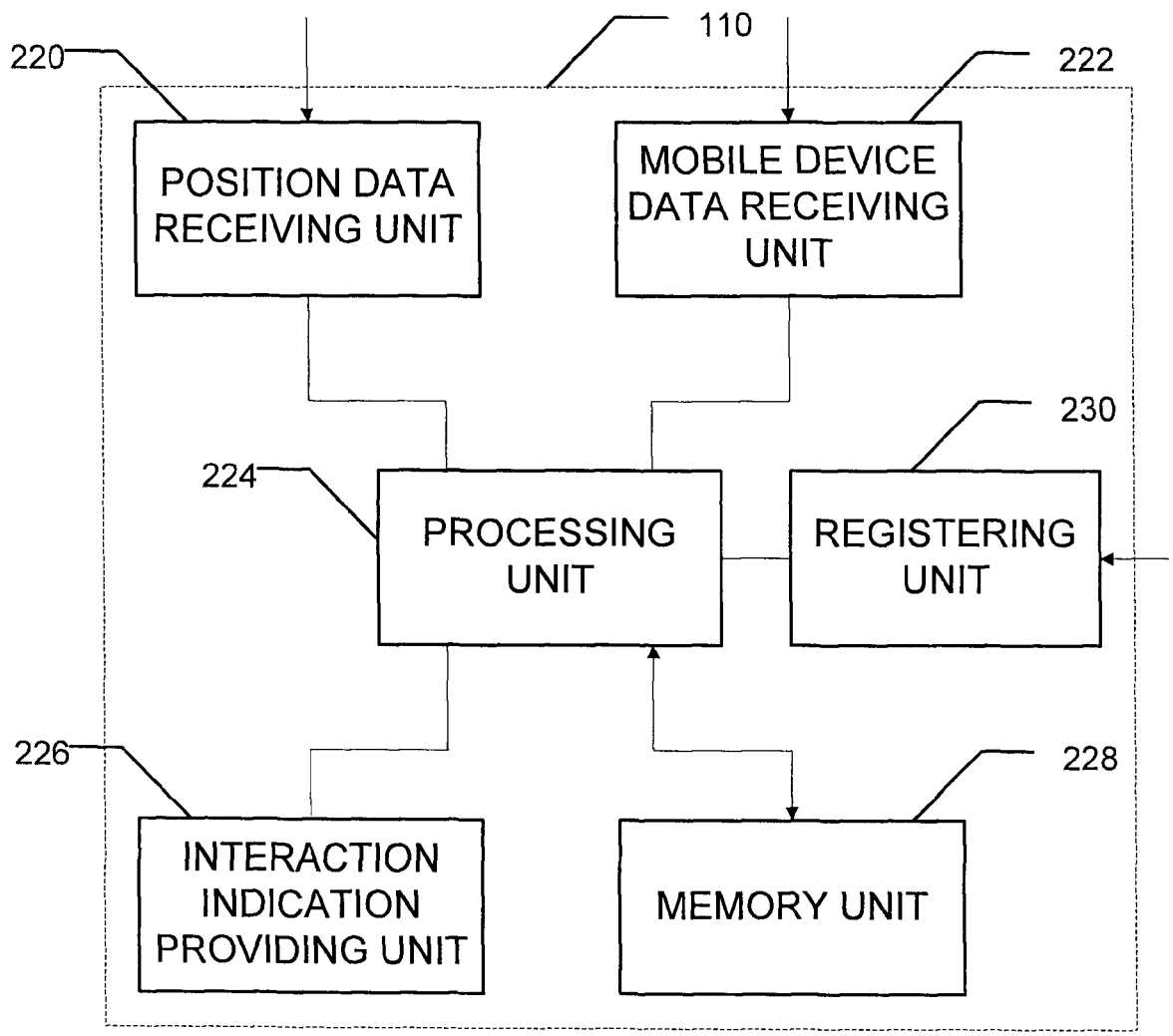
FIG. 2B is a block diagram which shows an embodiment of a vehicle interaction monitoring unit.

Now referring to FIG. 2B, there is shown an embodiment of the vehicle interaction monitoring unit 110.

In this embodiment, the vehicle interaction monitoring unit 110 comprises a position data receiving unit 220, a mobile device data receiving unit 222, a processing unit 224, an interaction indication providing unit 226 and a memory unit 228.

The position data receiving unit 220 is used for receiving a position data from the vehicle position data providing unit 202.

In one embodiment, the position data is received from the vehicle position data providing unit 202 via the first data network 204.

The mobile device data receiving unit 222 is used for receiving a mobile device data signal. The mobile data signal comprises position data from the mobile device 108 of the user of the vehicle.

In one embodiment, the position data is received from the mobile device 108 via the second data network 206.

The processing unit 224 is operatively connected to the position data receiving unit 220 and to the mobile device data receiving unit 222 and is used for comparing position data from the vehicle position data providing unit with the position data from the mobile device. The processing unit 224 is also used for the comparison between the position data from the vehicle position data providing unit with the position data from the mobile device for providing an indication of an interaction of the user with the vehicle.

In the embodiment disclosed in FIG. 2B, the vehicle interaction monitoring unit 110 further comprises a memory unit 228.

The memory unit 228 is operatively connected to the processing unit 224.

More precisely, processing unit 224 stores the position data from the vehicle position data providing unit and the position data from the mobile device over time in the memory unit 228.

It will be appreciated that in one embodiment, the use of the result from the comparison between the position data from the mobile device and the position data from the vehicle position data providing unit comprises detecting a variation over time in a result of a comparison between the stored position data from the vehicle position data providing unit and the stored position data from the mobile device.

Still referring to FIG. 2B, the vehicle interaction monitoring unit 110 further comprises an interaction indication providing unit 226.

The interaction indication providing unit 226 is operatively connected to the processing unit 224.

The interaction indication providing unit 226 is used for providing an indication of an interaction between the user and the vehicle to a third party.

It will be appreciated that in one embodiment, the third party is the user.

It will be appreciated that in one embodiment, the indication providing unit provides the indication of an interaction using one of an email, a SMS message and a call made on the mobile device of the user.

Still referring to FIG. 2B, the vehicle interaction monitoring unit 110 further comprises a registering unit 230. The registering unit 230 is operatively connected to the processing unit 224.

The registering unit 230 is used for receiving from a given user an indication of a given associated mobile device with a given vehicle. The processing unit 224 receives and stores in the memory unit 228 the position data from the given vehicle position data providing unit and the position data from the given mobile device over time together with an indication of the corresponding registered vehicle.

It will be appreciated that the registering unit 230 may be accessed by the given user via a data network, not shown.

In one embodiment, the data network for accessing the registering unit comprises the Internet and the vehicle registering unit 110 comprises a webserver.

Figure 3:
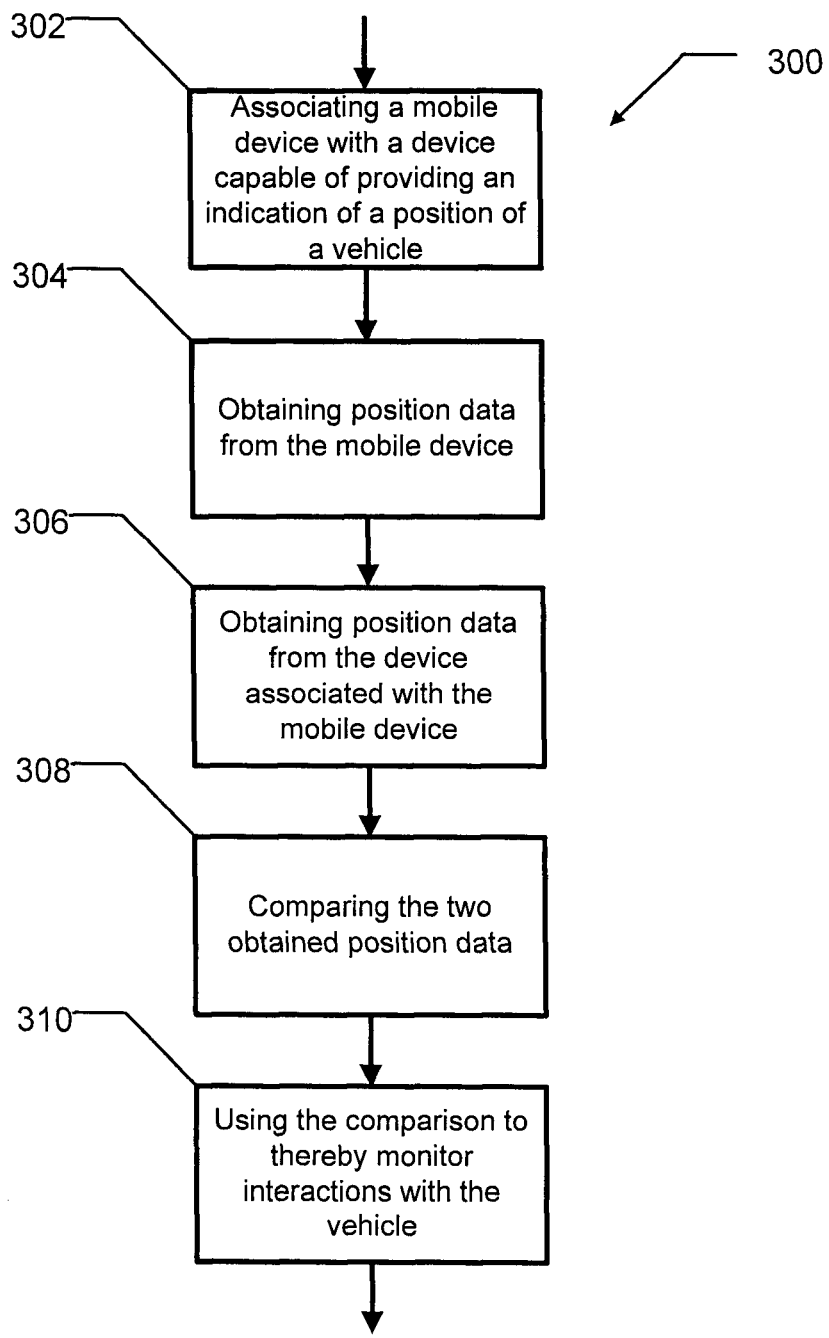
FIG. 3 is a flowchart which shows an embodiment of a method for monitoring interactions with a vehicle. According to a first processing step a mobile device is associated with a device capable of providing an indication of a position of a vehicle; according to a second processing step, position data is obtained from the mobile device; according to a third processing step, position data is obtained from the device associated with the mobile device; according to a fourth processing step, the two obtained position data are compared; according to a fifth processing step, the comparison is used to monitor the interactions with the vehicle.

Now referring to FIG. 3, there is shown an embodiment of a method for monitoring interactions with a vehicle.

According to processing step 302, a mobile device is associated with a device capable of providing an identification of a position of a vehicle to monitor.

Figure 4:
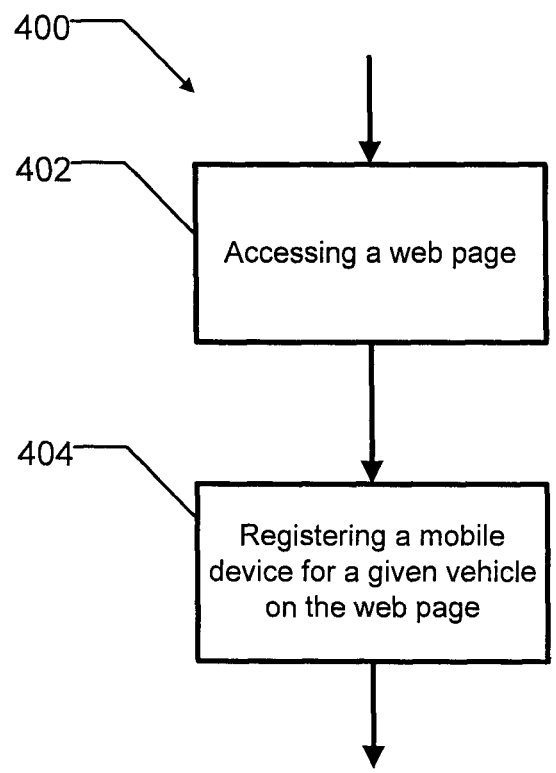
FIG. 4 is a flowchart which shows an embodiment of a method for associating a mobile device with a device capable of providing an indication of a position of a vehicle.

Now referring to FIG. 4, there is shown an embodiment of a method for associating a mobile device with a device capable of providing an identification of a position of a vehicle to monitor.

According to processing step 402, a web page is accessed. In one embodiment, the web page is accessed by a user wishing to associate the mobile device with the device capable of providing an identification of a position of a vehicle to monitor. Still in one embodiment, the web page is accessed using a browser. In one embodiment, the web page is accessed by the mobile device.

According to processing step 404, a mobile device is registered for a given vehicle on the web page.

It will be appreciated that in a preferred embodiment the registering of the mobile device may comprise various steps such as downloading an application to be executed on the mobile device. In this embodiment, the application downloaded is responsible for collecting and providing the position data from the mobile device to the vehicle interaction monitoring unit. It will be appreciated that the user wishing to associate the mobile device with the device capable of providing an identification of a position of a vehicle may provide an identification of the vehicle for which interactions will be monitored. The identification may comprise any type of identification such as a name, a vehicle identification number, a plate, customer identification number, etc.

It will be appreciated that the mobile device may be associated with a device capable of providing an identification of a position of a vehicle to monitor according to various other embodiments. For instance, the mobile device may be associated with a device capable of providing an identification of a position of a vehicle to monitor using a Short Message Service (SMS) message. In such embodiment, an operator would send a SMS message with an identification of a vehicle for which interactions will be monitored to an SMS gateway.

Now referring back to FIG. 3 and according to processing step 304, position data is obtained from the mobile device.

As mentioned above, the position data may be provided in one embodiment by an application located on the mobile device. An advantage of such embodiment is that the providing may be done transparently without any user input or feedback. In one embodiment, the application may also provide additional information such as an indication of a battery level in order to warn the vehicle interaction monitoring unit of a possible shortcoming turnoff of the mobile device.

Also, it will be appreciated that the position data may be provided according to various embodiments. For instance the position data may be provided upon request from the vehicle interaction monitoring unit, i.e. in a pull mode. Alternatively, the position data may be provided at given time intervals or when a given event occur (such as a detection of a motion), i.e. in push mode.

Still referring to FIG. 3 and according to processing step 306, position data is obtained from the device associated with the mobile device.

It will be appreciated that the position data may be obtained according to various embodiments. In one embodiment, the position data may be obtained upon request from the vehicle monitoring unit, i.e. in a pull mode. Alternatively, the position data may be obtained at given time intervals or when specific event occurs, i.e. in a push mode.

While it has been disclosed that position data is obtained from the mobile device and then position data is obtained from the device associated with the mobile device, it should be understood by the skilled addressee that the position data from the device associated with the mobile device may be obtained first and then position data may be obtained from the mobile device. Also and in another embodiment, it will be appreciated that the position data from the mobile device may be obtained at the same time than the position data obtained from the device associated with the mobile device.

Still referring to FIG. 3 and according to processing step 308, the position data obtained from the device associated with the mobile device is compared with the position data obtained from the mobile device.

It will be appreciated that the comparison may be performed according to various embodiments. For instance, the comparison may be performed at given time intervals. Alternatively the comparison may be performed when specific conditions occur, such as for instance when the vehicle is moving for instance.

According to processing step 310, the comparison is used to monitor interactions with the vehicle.

Figure 5:
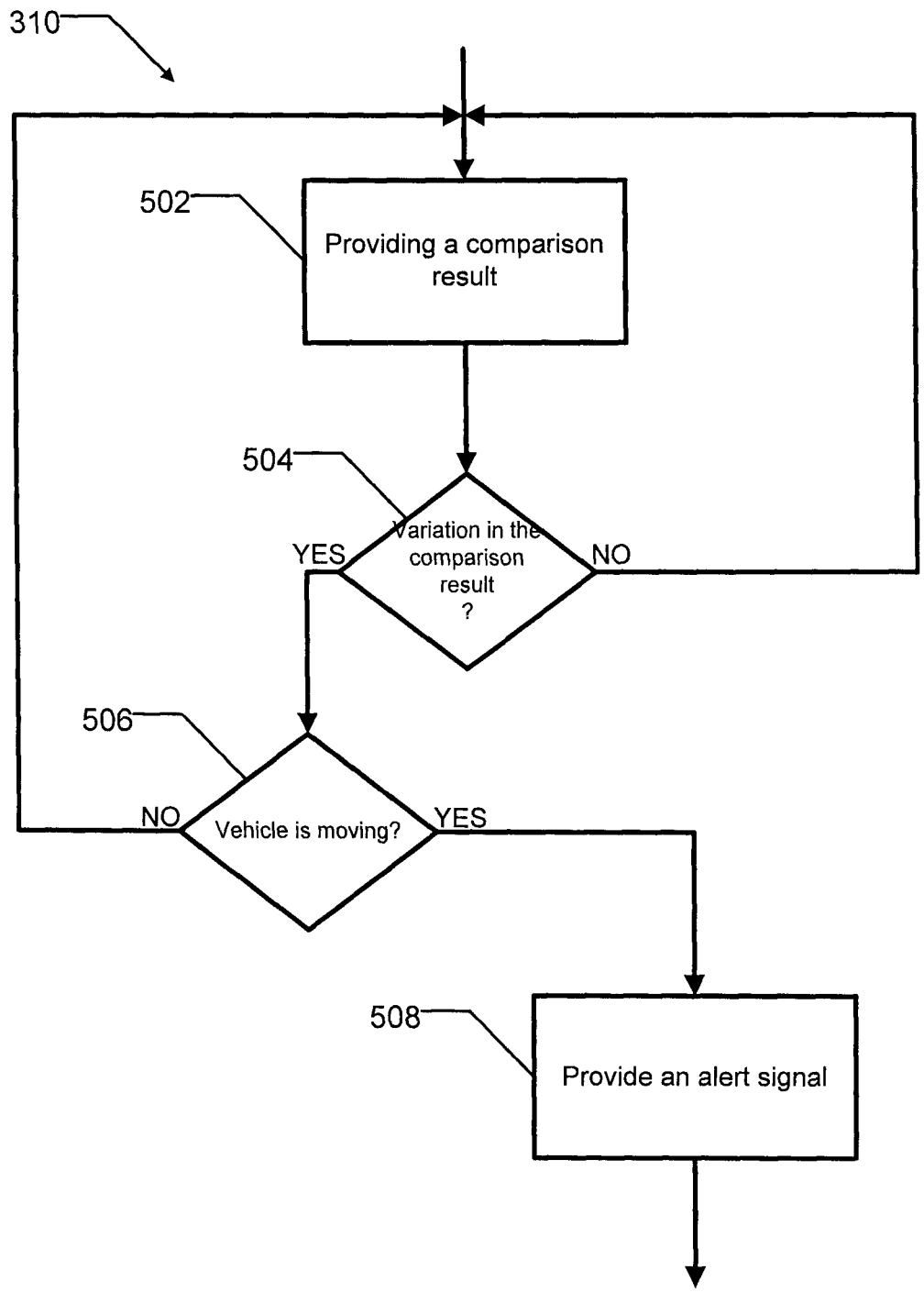
FIG. 5 is a flowchart which shows an embodiment of a method for using the comparison to monitor interactions with a vehicle.

Now referring to FIG. 5, there is shown an embodiment of how the comparison is used in order to monitor the interactions with the vehicle.

According to processing step 502, a comparison result is provided.

According to processing step 504, a test is performed in order to check if a variation in the comparison result occurs over time. More precisely, it is to find out if the comparison result increases in one embodiment or not. It will be appreciated that this may be the case for instance if the user is moving away from the car.

In the case where the comparison result increases and according to processing step 506, a test is performed in order to find out if the vehicle is moving. It will be appreciated that the test may be performed using vehicle position data.

In the case where the vehicle is moving and in accordance with processing step 508, an alert signal is provided. It will be appreciated that in an alternative embodiment the alert signal comprises a request for a status check sent to a user. It will be appreciated that the alert signal may be provided according to various embodiments. For instance the alert signal may be provided to the user via its mobile device using at least one of an SMS message, an audio signal provided using an application, an email, and a voice call. Alternatively, the alert signal may be provided on another processing device such as a web server and information may be accessed by a third party. It will be appreciated that the alert may be provided according to various embodiments. In one embodiment, the providing of the alert comprises sending an email to the third party. In another embodiment, the providing of the alert comprises sending an SMS message to the third party. In the case where the third party is the user, the providing of the alert may comprise calling the mobile device of the user.

The skilled addressee will appreciate that various other embodiments may be provided for monitoring the interactions with the vehicle using the comparison.

Also, it will be further appreciated that the comparison may be alternatively used for monitoring interactions with the vehicle in other ways. For instance, it may be pertinent to use the method disclosed herein for the purpose of monitoring the activity of a given user and its interactions with a given vehicle.

Figure 6:
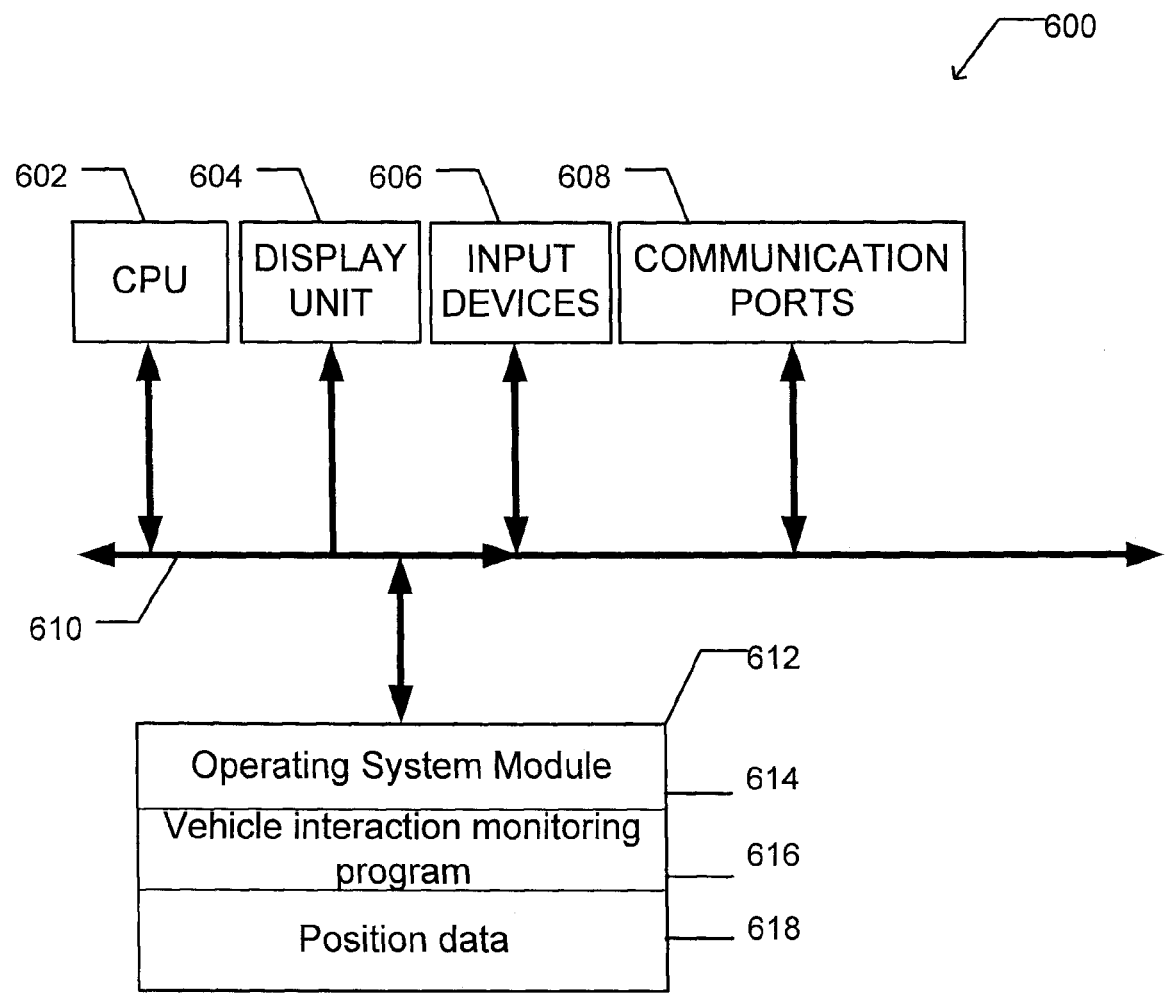
FIG. 6 is a block diagram which shows an embodiment of an implementation of a vehicle interaction monitoring unit.

Now referring to FIG. 6, there is shown an embodiment of an implementation of a vehicle interaction monitoring unit 600.

The vehicle interaction monitoring unit 600 comprises at least one Central Processing Unit (CPU) 602, a display unit 604, input devices 606, communication ports 608, a data bus 610 and a memory 612.

The at least one Central Processing Unit 602, the display unit 604, the input devices 606, the communication ports 608 and the memory 612 are connected together using the data bus 610.

The at least one Central Processing Unit 602 is used for processing instruction data as known to the skilled addressee.

The input devices 606 are used for providing data to the vehicle interaction monitoring unit 600.

The skilled addressee will appreciate that various embodiments may be provided for the input devices 606.

The communications ports 608 are used for enabling a communication of the vehicle interaction monitoring unit 600 with other devices. More specifically, the communications ports 608 are used for communicating with the mobile device 108 and the vehicle position data providing unit 202.

In this preferred embodiment, the communication ports 608 comprise a wireless network interface such as a wireless modem. The skilled addressee will again appreciate that various other embodiments may be provided for the communication ports 608.

The memory 612 is used for storing data.

More precisely and still in this preferred embodiment, the memory 612 comprises, inter alia, an operating system module 614. In a preferred embodiment, the operating system module 614 is Microsoft™ Windows 7. The memory 612 further comprises a SQL database operatively connected to a software program which may be accessed using a Graphics User Interface (GUI). The software program may be used for managing a proprietary wireless network of base stations.

The memory 612 further comprises a vehicle interaction monitoring program 616. The vehicle interaction monitoring program 616 is used for monitoring vehicle interactions in accordance with the method disclosed above.

The memory 612 further comprises a position data 618. The position data 618 comprises both position data stored originating from the mobile device and the vehicle position data providing unit.

It will be appreciated that the method for monitoring interactions with a vehicle may be constituted of one or more programs, wherein the one or more programs are configured to be executed by the at least one Central Processing Unit (CPU) 602, the one or more programs comprising instructions for associating a mobile device of a user allowed for operating the vehicle with a device capable of providing an indication of a position of the vehicle; instructions for obtaining position data from the device capable of providing an indication of a position of the vehicle; instructions for obtaining position data from the mobile device associated with the device; instructions for comparing the obtained position data from the device with the obtained position data from the mobile device, and instructions for using the comparison of the position data of the device with the position data of the mobile device to thereby monitor interactions with the vehicle.

It will be appreciated that a computer-readable storage medium may be further provided for storing computer-executable instructions which, when executed, cause a computing device to perform a method for monitoring interactions with a vehicle performing the method comprising associating a mobile device of a user allowed for operating the vehicle with a device capable of providing an indication of a position of the vehicle; obtaining position data from the device capable of providing an indication of a position of the vehicle; obtaining position data from the mobile device associated with the device; comparing the obtained position data from the device with the obtained position data from the mobile device and using the comparison of the position data of the device with the position data of the mobile device to thereby monitor interactions with the vehicle.

An advantage of the embodiment disclosed is that no key fob is required for implementing the method for monitoring interactions with a vehicle disclosed herein thanks to the use of a mobile device.

Another advantage of the method for monitoring interactions disclosed herein is that the method may be performed even if the vehicle is shared amongst a group of users provided that each user has a mobile device or an access to a mobile device.

Another advantage of one embodiment of the method disclosed is that the monitoring may be performed transparently with or without any user input. This may be of great advantage for checking a user activity.

Another advantage of one embodiment of the method disclosed is that an application running on the mobile device may also provide additional information such as an indication of a battery level in order to warn the vehicle interaction monitoring unit of a shortcoming turnoff of the mobile device.

It will be appreciated that the method disclosed herein may be advantageously used for monitoring interactions with an item. The item may be any item for which there is an interest in a monitoring of an interaction with a user.

More precisely and in this embodiment, the method comprises associating a mobile device of a user with a device capable of providing an indication of a position of the item. The method further comprises obtaining position data from the device capable of providing an indication of a position of the item. The method further comprises obtaining position data from the mobile device associated with the device. The method further comprises comparing the obtained position data from the device with the obtained position data from the mobile device and using the comparison of the position data of the device with the position data of the mobile device to thereby monitor interactions with the item.

Although the above description relates to a specific embodiments as presently contemplated by the inventors, it will be understood that the invention in its broad aspect includes mechanical and functional equivalents of the elements described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method for monitoring interactions with a vehicle, the method comprising:
associating a mobile device of a user allowed for operating the vehicle with a device capable of providing an indication of a position of the vehicle;
obtaining position data from the device capable of providing an indication of a position of the vehicle;
obtaining position data from the mobile device associated with the device;
comparing the obtained position data from the device with the obtained position data from the mobile device; and
using the comparison of the position data of the device with the position data of the mobile device to thereby monitor interactions with the vehicle.

2. The method as claimed in claim 1, wherein the associating of a mobile device of a user with a device capable of providing an indication of a position of the vehicle comprises accessing a web page and registering the mobile device of the user with a given vehicle.

3. The method as claimed in claim 2, wherein the registering of the mobile device of the user with the given vehicle comprises downloading and executing an application on the mobile device.

4. The method as claimed in claim 3, wherein the obtaining of the position data from the mobile device comprises the application providing the position data.

5. The method as claimed in claim 3, wherein the execution of the application comprises providing an indication of the vehicle to be monitored.

6. The method as claimed in claim 5, wherein the indication of the vehicle to be monitored is selected from a group consisting of a name, a Vehicle Identification Number (VIN), a plate and a customer identification number.

7. The method as claimed in claim 1, wherein the associating of a mobile device of a user allowed for operating the vehicle with a device capable of providing an indication of a position of the vehicle comprises sending a short message service (SMS) message comprising an identification of the vehicle to a SMS gateway.

8. The method as claimed in claim 1, wherein the obtaining of position data from the device capable of providing an indication of a position of the vehicle comprises obtaining position data from one of a GPS receiver installed in the vehicle and an OnStar™ FMV device installed in said vehicle.

9. The method as claimed in claim 1, wherein the obtaining of position data from the device capable of providing an indication of a position of the vehicle comprises determining an indication of a geographic sector where the vehicle is located.

10. The method as claimed in claim 9, wherein the determining of an indication of a geographic sector where the vehicle is located comprises providing a vehicle with a wireless transmitter and a given one of a plurality of wireless receivers receiving a signal transmitted by the wireless transmitter and providing a corresponding identification of a sector where the given receiver is located.

11. The method as claimed in claim 1, wherein the comparing of the obtained position data from the device with the obtained position data from the mobile device is performed over time, further wherein the using of the comparison of the position data of the device with the position data of the mobile device comprises detecting a variation in a comparison result, further wherein if the variation is detected, determining if the vehicle is moving and further wherein if the vehicle is moving, providing an alert to a third party.

12. The method as claimed in claim 11, wherein the third party is the user of the vehicle.

13. The method as claimed in claim 11, wherein the providing of the alert comprises sending an email to the third party.

14. The method as claimed in claim 11, wherein the providing of the alert comprises sending an SMS message to the third party.

15. The method as claimed in claim 12, wherein the providing of the alert comprises calling the mobile device of the user.

16. A vehicle interaction monitoring unit for monitoring interactions with a vehicle, the vehicle interaction monitoring unit comprising:
a position data receiving unit for receiving a position data from a vehicle position data providing unit;
a mobile device data receiving unit for receiving a mobile device data signal, the mobile data signal comprising position data from the mobile device of a user of the vehicle;
a processing unit operatively connected to the position data receiving unit and to the mobile device data receiving unit, the processing unit for comparing position data from the vehicle position data providing unit with the position data from the mobile device, the processing further using a result from the comparison between the position data from the vehicle position data providing unit with the position data from the mobile device for providing an indication of an interaction of the user with the vehicle.

17. The vehicle interaction monitoring unit as claimed in claim 16, wherein the position data is received from the vehicle position data providing unit via a data network.

18. The vehicle interaction monitoring unit as claimed in claim 16, wherein the position data is received from the mobile device via a data network.

19. The vehicle interaction monitoring unit as claimed in claim 16, wherein the vehicle position data providing unit comprises one of a GPS receiver and an OnStar™ FMV device.

20. The vehicle interaction monitoring unit as claimed in claim 16, further comprising a memory unit operatively connected to the processing unit, wherein the processing unit stores the position data from the vehicle position data providing unit and the position data from the mobile device over time in the memory unit.

21. The vehicle interaction monitoring unit as claimed in claim 20, wherein the use of the result from the comparison between the position data from the vehicle position data providing unit with the position data from the mobile device comprises detecting a variation over time in a result of a comparison between the stored position data from the vehicle position data providing unit and the stored position data from the mobile device.

22. The vehicle interaction monitoring unit as claimed in claim 16, further comprising an interaction indication providing unit operatively connected to the processing unit, the interaction indication providing unit for providing an indication of an interaction between the user and the vehicle to a third party.

23. The vehicle interaction monitoring unit as claimed in claim 22, wherein the third party is the user.

24. The vehicle interaction monitoring unit as claimed in claim 23, wherein the interaction indication providing unit provides the indication of an interaction using one of an email, a SMS message and a call made on mobile device of the user.

25. The vehicle interaction monitoring unit as claimed in claim 20, further comprising a registering unit operatively connected to the processing unit, the registering unit for receiving from a given user an indication of a given associated mobile device with a given vehicle, further wherein the processing unit receives and stores in the memory unit the position data from the given vehicle position data providing unit and the position data from the given mobile device over time together with an indication of the corresponding registered vehicle.

26. The vehicle interaction monitoring unit as claimed in claim 25, wherein the registering unit is accessed by the given user via a data network.

27. The vehicle interaction monitoring unit as claimed in claim 26, wherein the data network comprises the Internet, further wherein the vehicle registering unit comprises a web server.

28. A method for monitoring interactions with an item, the method comprising:
associating a mobile device of a user with a device capable of providing an indication of a position of the item;
obtaining position data from the device capable of providing an indication of a position of the item;
obtaining position data from the mobile device associated with the device;
comparing the obtained position data from the device with the obtained position data from the mobile device; and
using the comparison of the position data of the device with the position data of the mobile device to thereby monitor interactions with the item.

29. A computer-readable storage medium storing computer-executable instructions which, when executed, cause a computing device to perform a method for monitoring interactions with a vehicle performing, the method comprising:
associating a mobile device of a user allowed for operating the vehicle with a device capable of providing an indication of a position of the vehicle;
obtaining position data from the device capable of providing an indication of a position of the vehicle;
obtaining position data from the mobile device associated with the device;
comparing the obtained position data from the device with the obtained position data from the mobile device; and
using the comparison of the position data of the device with the position data of the mobile device to thereby monitor interactions with the vehicle.

30. A computing device, the computing device comprising:
a display unit;
a processing unit operatively connected to the display unit;
a memory operatively connected to the processing unit, the memory comprising one or more programs, wherein the one or more programs are stored in the memory and configured to be executed by the processing unit, the one or more programs including:
instructions for associating a mobile device of a user allowed for operating the vehicle with a device capable of providing an indication of a position of the vehicle;
instructions for obtaining position data from the device capable of providing an indication of a position of the vehicle; instructions for obtaining position data from the mobile device associated with the device;
instructions for comparing the obtained position data from the device with the obtained position data from the mobile device, and
instructions for using the comparison of the position data of the device with the position data of the mobile device to thereby monitor interactions with the vehicle.

\* \* \* \* \*